Jan. 18, 1938. A. L. V. C. DEBRIE 2,106,115
CINEMATOGRAPHIC INTERMITTENT FILM FEED AND SHUTTER
Filed March 15, 1937 2 Sheets-Sheet 1

Jan. 18, 1938.  A. L. V. C. DEBRIE  2,106,115
CINEMATOGRAPHIC INTERMITTENT FILM FEED AND SHUTTER
Filed March 15, 1937  2 Sheets-Sheet 2

Patented Jan. 18, 1938

2,106,115

UNITED STATES PATENT OFFICE 2,106,115

CINEMATOGRAPHIC INTERMITTENT FILM FEED AND SHUTTER

Andre Leon Victor Clement Debrie, Paris, France

Application March 15, 1937, Serial No. 131,054
In Great Britain June 27, 1936

3 Claims. (Cl. 88—18.4)

In cinematograph projection apparatus, it is necessary in order to prevent flicker to use a three-blade shutter so as to provide a number of obturations per second which is at least equal to 48, the speed of the silent films being 16 per second. As each blade of a revolving shutter subtends an angle of 60° at the axis of rotation the film is caused to move downwards during the time of obturation i. e. during a rotation of 60°. If the film is fed by pins, the movement is obtained generally by means of a small suitably-shaped cam the action of which is multiplied by a lever system which acts on the carriage carrying the film feed pins.

My invention has primarily for its object an improvement to such devices according to which the lever system is adapted to pivot about an axis parallel to the plane of the cam so as to allow an advancing and receding movement of the pin-carrying carriage. This movement is also multiplied, as is the downward motion of the film, through a control which comprises a multiplying lever pivotally secured on one hand to the usual cam controlling the engagement and disengagement of the pins and on the other to the carriage itself.

Now apparatus projecting sound films and operating at the rate of 24 pictures per second are generally provided with a two-blade shutter providing 48 obturations per second, each blade of which subtends an angle of 90°.

If I apply to such an apparatus the above disclosed device providing each required forward travel of the film during a rotation of 60° it is of advantage to use a shutter the two blades of which subtend an angle of also 60°, which increases the time of illumination allowed. Accordingly I use for this purpose a shutter comprising a fixed blade and movable blades all of which are, for the reasons given above, made to subtend an angle of 60°. Such a shutter may thus be used alternatively as a two blade or a three-blade shutter keeping the number of obturations per second (i. e. 48) the same, the relative speed of feed of the two types of films being taken into account. To this end the two movable blades are set independently of each other either in their usual normal position at 120° to the fixed blade or in superposed relationship at 180° thereto. It is of particular advantage to change from the two blade sound film arrangement to the three blade silent film arrangement without disturbance of the correct balance of the shutter and therefore I prefer to make the thickness or the weight of each movable blade equal to half or to the whole of that of the fixed blade; each movable blade may include in this case a half hub arranged so as to overlap respectively in the three-blade or in the two blade arrangement and thus to make up for the lack of balance between the removable and the fixed blades.

The accompanying drawings show by way of example a preferred embodiment of my invention adapted for projection, although it can also be used for recording.

Figure 1:
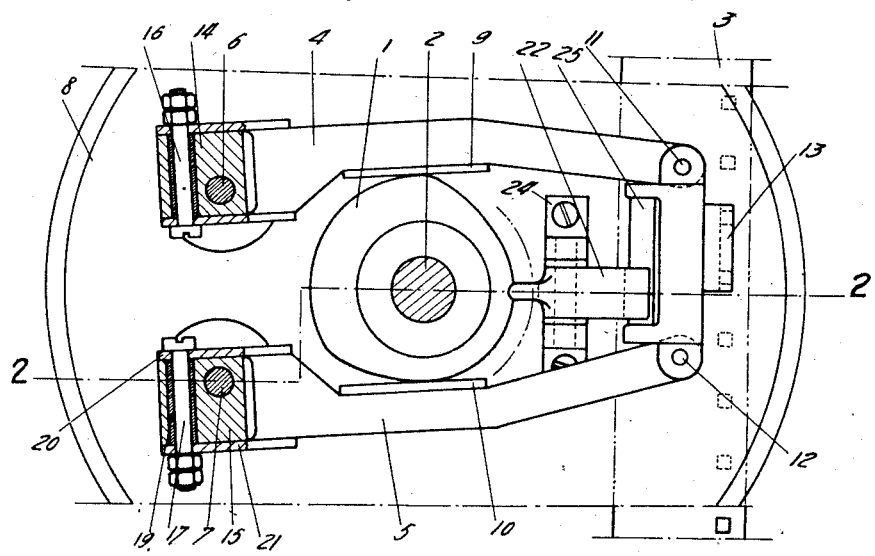
Fig. 1 is a front view of the intermittent film-feeding means, the shutter being removed.
Figure 2:
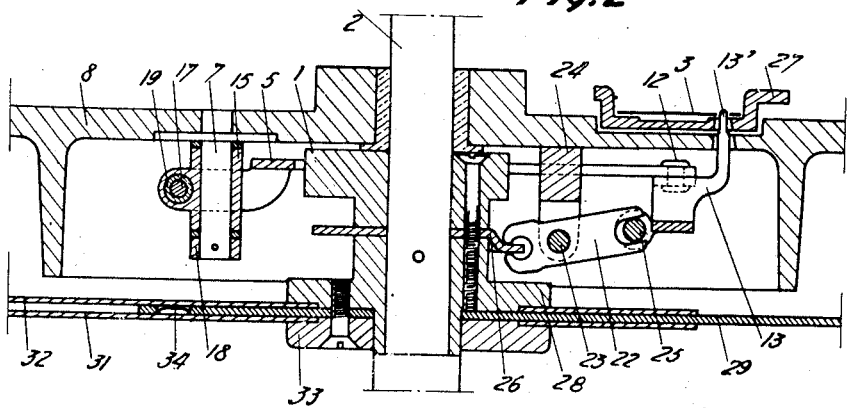
Fig 2 is a horizontal cross-section along lines 2—2 of Fig. 1.
Figure 3:
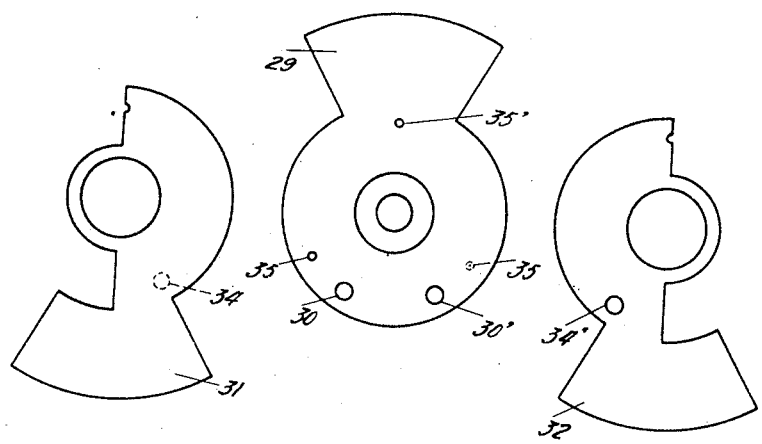
Fig. 3 is a view of the three elements forming the combined shutter serving alternatively for sound and silent films.

As apparent from Figs. 1 and 2, the cam 1, designed for intermittently feeding the film during rotation of the shutter through an angle of 60° corresponding to the cutting off of the light by a shutter blade, is keyed to a shaft 2. In order to enable this cam to be of small size, the difference between the smallest and largest radii of the cam is smaller than the distance travelled by the film at each movement, this distance being equal to the height of a picture. Two arms 4 and 5 are pivotally secured at 6 and 7 to the casing 8 and their inner surfaces 9 and 10 bear against the cam 1. The ends of the arms 4 and 5 are pivotally secured, at points 11 and 12 respectively, to the carriage 13 carrying the feed pins, so that the carriage rises and sinks along a substantially rectilinear line due to the combined rotation of the cam 1 and pivotal motion of the levers 4 and 5.

The lengths of the arms of the levers 4 and 5 are calculated so as to give the carriage 13 the travel required to make the film move downwards a distance equal to the height of a picture; the levers 4 and 5 thus act as amplifying means.

The levers 4 and 5 are mounted on their pivots 6 and 7 respectively through supports 14 and 15 which permit the levers to pivot in a direction perpendicular to that of the plane of Fig. 1 round threaded spindles 16 and 17 and so to allow the pins 13' to move into and out of the perforations of the films 3. A stop ring 18 holds each support and thereby each arm on its axis 6 or 7. A hollow spacer 19 is fitted over each spindle 16, 17 between lugs 20, 21 provided on the corresponding arm 4 or 5 so that the arms may pivot round their support even when the nuts are screwed down on the threaded spindles 16 and 17. The movement of the feed pins into and out of the film is performed as follows: a lever 22 rotates round a vertical pivot 23 carried by a bridge piece 24 secured to the casing 8; this lever engages, at one end, a rod 25 rigid with the pin-carrying carriage 13 and, at the other, a cam 26 driven by the shaft 2 in the usual manner. The film 3 is also guided in the usual manner inside the channel 27. It is apparent that the film-feeding movements provided in accordance with my invention are performed in perfect cooperation with these movements of the pins into and out of the film.

Figure 4:
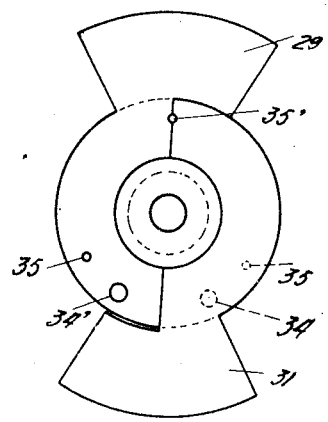
Figs. 4 and 5 show the same shutter as used for projecting sound films, and silent films respectively.
Figure 5:
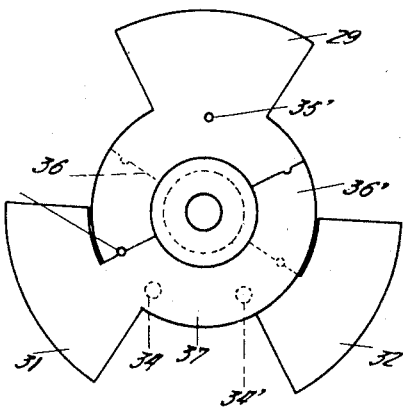

The shaft 2 also carries the hub 28 of the shutter which is illustrated only in Figs. 2, 3, 4, and 5. The shutter comprises three blades; the first blade 29, the sides of which are inclined to one another at an angle of 60°, forms part of or is rigidly secured to the hub 28 and its central portion has two apertures or recesses 30, 30¹ arranged symmetrically with reference to its axis; the two other blades 31, 32, the sides of which are also inclined at an angle of 60° are removable and may be mounted at either side of the plane of the fixed blade. These two removable blades may be adjusted in opposite directions through an angle of 60°, between the hub 28 and a centering ring 33 also carried by the shaft 2. Also, each blade 31, 32 carries a spigot 34 or 34' adapted to engage one of the apertures 30, 30' of the stationary blade 29. Consequently, when the two movable blades are superposed as illustrated in Fig. 4 with the spigot 34 engaging the aperture 30' and the spigot 34' engaging the aperture 30, I obtain a shutter with two diametrically opposed blades adapted for the projection of sound films. If the blades are now rotated through angles of 60° in opposite directions they will take up positions in which their axes are at 120° on either side of the axis of the fixed blade, which provides a three blade shutter as shown in Fig. 5 which may be used for projecting silent films. In this case the spigots 34 and 34' are engaged with the apertures 30 and 30' respectively. Stops 35 and 35' carried by the hub prevent the blades 31, 32 from being rotated beyond the desired end of their stroke, and the elasticity of these movable blades is sufficient to allow the spigots, at the beginning of the adjustment, to be disengaged, and at the end, to reengage in the apertures 30, 30' of the fixed blade 29 when it is desired to change the two blade shutter into a three blade shutter and conversely. The blades are balanced, due to the fact that the thickness of the movable blades 31, 32 is equal to half that of the fixed blade 29; therefore in the case of a shutter arranged as a two-blade shutter, the two thin blades 31, 32 are superimposed and form together the exact counterweight of the thick part 29 which is diametrically opposite to them.

In the case where the shutter is mounted as a three-blade shutter, the lack of balance due to the thinness of the blades 31 and 32 with respect to the thickness of the blade 29 is compensated by a lack of balance of opposite sense provided by the arrangement of the half-hubs 36, 36' carried by each of the movable blades 31, 32. This lack of balance, which is calculated to counteract that due to the blades 31, 32 proper, is due to the fact that whereas in the two blade shutter the two half-hubs form an entire and balanced hub in the case of three-blade shutter (Fig. 5), the hubs partially overlap each other at 37 on the side of the shutter on which are the lighter blades and they leave a space on the opposite side. When the weight of the fixed blade is equal to that of one of the removable blades it is possible to provide on the contrary an overlap on the fixed blade side in order to provide balance in the two-blade arrangement. It is obvious that the arrangements described as applicable to a projecting machine may be applied without any modification to a cinematographic recording machine chiefly with a view to increasing the duration of exposure of the film to be taken. Moreover, it is possible, without widening the field of my invention, to make numerous modifications in the device described chiefly as regards the construction of the double purpose shutter and the particular mechanisms used for amplifying the cam-controlled movements and for providing the movements of the feed pins to and from the film.

What I claim is:

1. In a cinematographic apparatus a mechanism for the intermittent feed of the film past the film gate comprising a support, a pin carrier, two lever arms lying in a plane substantially parallel to the plane of the film gate, means for mounting said lever arms at one end on the support so as to allow their rocking both in their plane and in a direction perpendicular thereto, means whereby the pin carrier is pivotally secured between the free ends of both lever arms, a small sized cam arranged between intermediate parts of the lever arms and adapted to control their reciprocating motion in their plane a shaft controlling the rotation of the cam and a second cam carried by said shaft adapted to constrain periodically the pin carrier and cooperating lever arms to reciprocate in a direction perpendicular to the plane of the film gate.

2. In a cinematographic apparatus, a mechanism for the intermittent feed of the film past the film gate comprising a support, a pin carrier, two lever arms lying in a plane substantially parallel to the plane of the film gate, a double pivotal connection between one end of each lever arm and the support for allowing said lever arms to rock in unison both in their plane and in a direction perpendicular thereto, means whereby the pin carrier is pivotally secured between the free ends of both lever arms, a small sized cam arranged between intermediate parts of the lever arms and adapted to control their reciprocating motion in their plane, a rotary shaft carrying said cam, a second cam carried by said shaft, a pivot carried by the support substantially parallel to the longitudinal direction of the film gate, a lever mounted on said pivot and engaging through its ends the edge of the second cam and the pin carrier respectively whereby the said second cam constrains periodically the pin carrier and cooperating levers to reciprocate in a direction perpendicular to the plane of the film gate.

3. In a cinematographic apparatus, a mechanism for the intermittent feed of the film past the film gate comprising a support, a pin carrier, two lever arms lying in a plane substantially parallel to the plane of the film gate, a double pivotal connection between one end of each lever arm and the support for allowing said lever arms to rock in unison both in their plane and in a direction perpendicular thereto, means whereby the pin carrier is pivotally secured between the free ends of both lever arms, a small sized cam arranged between intermediate parts of the lever arms and adapted to control their reciprocating motion in their plane, a rotary shaft carrying said cam, a second cam carried by said shaft adapted to constrain periodically the pin carrier and cooperating levers to reciprocate in a drection perpendicular to the plane of the film gate, a shutter mounted on the same shaft and including a fixed and two movable blades, all three blades subtending an angle of 60° and the movable blades being adapted to be set at will at 120° of one another and of the fixed blade and in superposed relationship at 180° of said fixed blade, and two half hubs corresponding respectively to each of the movable blades and adapted to partly overlap for one of the predetermined relative angular positions of the movable blade.

ANDRE LEON VICTOR CLEMENT DEBRIE.